F. STILLWELL.
SAFETY ATTACHMENT FOR SCAFFOLDS.
APPLICATION FILED DEC. 16, 1914.
1,148,872.
Patented Aug. 3, 1915.
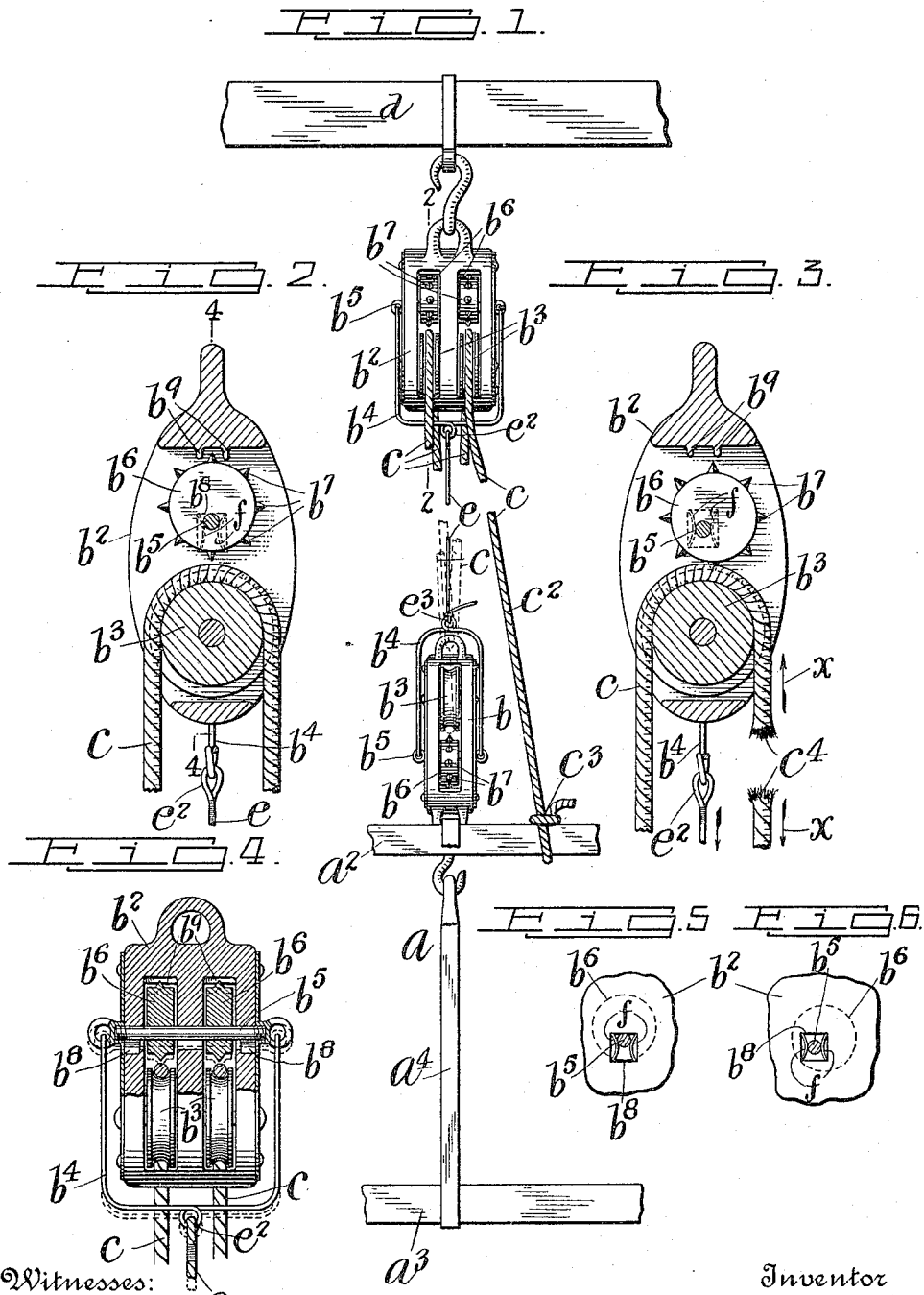
Inventor
Frank Stillwell,
By his Attorneys

UNITED STATES PATENT OFFICE.

FRANK STILLWELL, OF BROOKLYN, NEW YORK.

SAFETY ATTACHMENT FOR SCAFFOLDS.

1,148,872.   Specification of Letters Patent.   Patented Aug. 3, 1915.

Application filed December 16, 1914. Serial No. 877,465.

*To all whom it may concern:*

Be it known that I, FRANK STILLWELL, a citizen of the United States, and residing at Brooklyn, in the county of Kings and State of New York, have invented certain new and useful Improvements in Safety Attachments for Scaffolds, of which the following is a specification, such as will enable those skilled in the art to which it appertains to make and use the same.

This invention relates to safety devices or attachments for use in connection with scaffolds, and the object thereof is to provide an improved device of this class which is simple in construction and efficient in operation and which will prevent the dropping or falling of a scaffold in case the suspending cords or cables should break, and with this and other objects in view the invention consists in a device or apparatus of the class specified, constructed and operating as hereinafter described.

The invention is fully disclosed in the following specification, of which the accompanying drawing forms a part, in which the separate parts of my improvement are designated by suitable reference characters in each of the views, and in which:—

Figure 1 is a side view of a part of a scaffold and showing my improvement applied thereto; Fig. 2 a section on the line 2—2 of Fig. 1 and showing the parts in their normal position; Fig. 3 a view similar to Fig. 2 but showing the position the parts assume if the supporting rope or cable should break; Fig. 4 a partial section on the line 4—4 of Fig. 2; and, Figs. 5 and 6 are sectional views of a detail of the construction.

In the drawing forming part of this specification, I have shown at $a$ a part of a scaffold, consisting of top and bottom members $a^2$ and $a^3$ connected as shown at $a^4$, but it will be understood that the scaffold may be of any preferred construction. I have also shown in said figure a pulley block $b$ connected with the scaffold and a similar pulley block $b^2$ connected with the pulley block $b$ by the usual rope or cable $c$ and, in practice, the pulley block $b^2$ is suspended from any suitable overhead support $d$.

The pulley blocks $b$ and $b^2$, in the form of construction shown, are ordinary double and single pulley blocks and are provided with pulley wheels $b^3$, and said pulley blocks are also provided with yokes $b^4$ which are loosely connected with shafts $b^5$ passed eccentrically through the pulley blocks $b$ and $b^2$, and on which are mounted eccentric cam wheels $b^6$ provided with projecting teeth $b^7$.

The yokes $b^4$ of the separate pulley blocks are connected by a cord $e$ which is secured to the yoke of the upper pulley block $b^2$ at $e^2$ and detachably connected with the yoke of the lower pulley block at $e^3$, and this connection may be broken in the operation of a scaffold and the length of the cord $e$ adjusted so as to provide for the vertical movement or adjustment of the scaffold.

The shafts $b^5$ of the cam wheels $b$ pass through rectangular openings $b^8$ in the sides of the pulley blocks as shown in Figs. 4, 5 and 6, and in the opposite sides of said slots are placed arc-shaped springs $f$, and in the normal position of the parts the shafts $b^5$ are held in the top parts of the openings $b^8$ in the top pulley block $b^2$, and in the bottom part of the corresponding openings in the bottom pulley block $b$.

The top and bottom parts of the pulley blocks are preferably provided with depending pins or projections $b^9$ in connection with which the teeth of the cam wheels $b^6$ operate under certain conditions as hereinafter described. With this construction, when the apparatus is in use, the end $c^2$ of the rope or cable $c$ is detachably connected with the scaffold at $c^3$ and, if at any time, said rope or cable should break as shown at $c^4$ in Fig. 3 and the rope or cable should start to pull through the pulley blocks in the direction of the arrows $x$ in said figure, the cord $e$ would operate at once to move the cam wheels $b^6$ of the separate pulley blocks in the direction of the pulley wheels $b^3$ and the teeth $b^7$ of said cam wheels would engage the rope or cable as shown in Fig. 3, and said cam wheels would be thrown into operation and would grasp and hold the said rope or cable and prevent its movement through the pulley blocks and this, as would be understood, would prevent the dropping or falling of the scaffold.

In order to raise or lower the scaffold the ends $c^2$ of the rope or cable $c$ must be detached from the scaffold and manipulated in the manner of other devices of this class and, in this operation, in order to lower the scaffold the cord $e$ must first be detached from the yoke $b^4$ of the lower pulley block $b$ and slackened and again secured, and in the operation of raising the scaffold after said scaffold has been raised by the manipulation of the end portion $c^2$ of the rope or cable $c$ the cord $e$ must be tightened as will be readily understood.

In Fig. 1 of the accompanying drawing, that part of the rope or cable $c$ which is connected with the lower pulley block is shown in dotted lines only so as to not confuse the drawing, and so as to show the method of operating the cord $e$, but it will be understood that the rope or cable $c$ is connected with the pulley blocks $b$ and $b^2$ in the usual manner.

In the operation of apparatus of this class it is possible for foreign substances to become connected with the cable $c$, and when said substances pass between the cam wheels $b^6$ and the corresponding pulley wheels they might operate said cam wheels and the pins or projections $b^9$ in the pulley blocks are designed to prevent such operation, but these pins or projections will not interfere with the operation of said cam wheels, as herein described, in case the rope or cable $c$ should break.

My invention is not limited to the use of the arc-shaped springs $f$ for holding the shafts $b^5$ and cam wheels $b^6$ out of operation and other forms of springs may be employed for this purpose, nor is my invention limited to a double pulley block, or to pulley blocks of any specific construction, and various changes in and modifications of the details of construction herein described may be made, within the scope of the appended claim, without departing from the spirit of my invention or sacrificing its advantages.

Having fully described my invention, what I claim as new and desire to secure by Letters Patent, is;—

A scaffold device provided with a pulley block, another pulley block adapted to be connected with an overhead support, said pulley blocks being provided with pulley wheels on which is mounted a rope or cable by which said blocks are connected, cam wheels mounted in the bottom portion of the pulley block connected with the scaffold and movable toward and from the pulley wheels therein, other cam wheels mounted in the top portion of the pulley block adapted to be connected with an overhead support and movable toward and from the pulley wheels in said block, and means for connecting the cam wheels of both blocks.

In testimony that I claim the foregoing as my invention I have signed my name in presence of the subscribing witnesses this 14th day of December 1914.

FRANK STILLWELL.

Witnesses:
C. MULREANY,
H. E. THOMPSON.

Copies of this patent may be obtained for five cents each, by addressing the "Commissioner of Patents, Washington, D. C."